(12) United States Patent
Takahata

(10) Patent No.: US 8,383,271 B2
(45) Date of Patent: Feb. 26, 2013

(54) ELECTRODE AND METHOD FOR MANUFACTURING THE SAME

(75) Inventor: Koji Takahata, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 305 days.

(21) Appl. No.: 12/812,251

(22) PCT Filed: Dec. 25, 2008

(86) PCT No.: PCT/JP2008/073617
§ 371 (c)(1),
(2), (4) Date: Jul. 9, 2010

(87) PCT Pub. No.: WO2009/087917
PCT Pub. Date: Jul. 16, 2009

(65) Prior Publication Data
US 2010/0285369 A1    Nov. 11, 2010

(30) Foreign Application Priority Data
Jan. 11, 2008   (JP) ................................. 2008-004071

(51) Int. Cl.
*H01M 4/58* (2010.01)
*H01M 4/02* (2006.01)
*H01M 4/82* (2006.01)

(52) U.S. Cl. ................. 429/231.95; 429/209; 429/623.1

(58) Field of Classification Search ...... 29/623.1–623.5; 429/231.95, 209, 623.1
See application file for complete search history.

(56) References Cited

U.S. PATENT DOCUMENTS

| | | | | |
|---|---|---|---|---|
| 6,159,635 A | * | 12/2000 | Dasgupta et al. | 429/216 |
| 2002/0028380 A1 | * | 3/2002 | Tanjo et al. | 429/209 |
| 2007/0122698 A1 | * | 5/2007 | Mitchell et al. | 429/217 |

FOREIGN PATENT DOCUMENTS

| | | |
|---|---|---|
| JP | 56-32677 | 4/1981 |
| JP | 62-91356 | 6/1987 |
| JP | 9-97625 | 4/1997 |
| JP | 2003-157852 | 5/2003 |
| JP | 2006-4739 | 1/2006 |
| WO | WO 96/04689 | 2/1996 |

OTHER PUBLICATIONS

International Search Report in International Application No. PCT/JP2008/073617 (Mar. 31, 2009).
Translation of the International Preliminary Report on Patentability dated Sep. 16, 2010 for PCT/JP2008/073617.
Office Action for Korean Appl. No. 10-2010-7015155 dated Jun. 1, 2012.

* cited by examiner

*Primary Examiner* — Jessee R. Roe
(74) *Attorney, Agent, or Firm* — Finnegan, Henderson, Farabow, Garrett & Dunner, L.L.P.

(57) ABSTRACT

An electrode 30 (such as a positive electrode for a lithium ion battery) is provided in which an active material layer (35), having an electrode active material as a main component thereof, is held by a metallic power collector (32). A barrier layer (33) containing a non-water-soluble polymeric material (334) and a conductive material (332) is provided on the surface of the power collector (32). An interconnecting layer (34), having higher electrical conductivity than the barrier layer (33) and containing a polymeric material (344) and a conductive material (342), is interposed between the barrier layer (33) and the active material layer (35).

18 Claims, 8 Drawing Sheets

ELECTRODE AND METHOD FOR MANUFACTURING THE SAME

TECHNICAL FIELD

The present invention relates to an electrode that uses as a constituent feature thereof a battery (such as a lithium ion battery), and to a method for manufacturing the same.

The present application claims priority on the basis of Japanese Patent Application No. 2008-004071, filed on Jan. 11, 2008, the entire content of which is incorporated herein by reference.

BACKGROUND ART

Electrodes are known that have a configuration in which a material capable of releasing a chemical species that functions as a charge carrier is held by a power collector. An example of this type of electrode is an electrode for a secondary battery having a configuration in which a material (active material) capable of reversibly occluding and releasing the chemical species is held by a metallic power collector. This electrode can be used as a positive electrode or negative electrode that composes a lithium ion battery in which an electrolyte (typically a non-aqueous electrolyte), interposed between the positive electrode or negative electrode and a counter-electrode, is charged and discharged by the migration of lithium ions. A typical example of a method for holding the active material on the power collector is a method in which a paste-like or slurry-like composition, in which a powder of the active material is dispersed in a solvent (active material composition), forms a layer consisting mainly of the active material (active material layer) by applying to an electrode power collector. An aqueous active material composition, in which the solvent that composes the above-mentioned medium (dispersion medium of the active material powder and the like) is an aqueous solvent, is preferable for the active material composition used in this method from the viewpoints of, for example, reduced burden on the environment, reduced material consumption, simplification of equipment, reduced waste, and improved handling ease.

However, depending on the contents of the active material, problems can occur such as a decrease in battery capacity due to the use of an aqueous composition or a decrease in discharge characteristics due to an increase in initial internal resistance. These can be caused by a reaction between the active material contained in the paste and water. For example, in the case of using a lithium transition metal oxide such as a lithium-nickel-based oxide as a positive electrode active material (referring to an oxide containing lithium and one type or two or more types of a transition metal element as constituent metal elements, and to apply similarly hereinafter), an exchange reaction between protons and lithium ions can occur on the surface of the positive electrode active material dispersed in an aqueous solvent, thereby resulting in the pH of the aqueous active material composition being high (namely, becoming alkaline). When this high-pH aqueous active material composition is applied to a positive electrode power collector (such as an aluminum power collector), compounds demonstrating high electrical resistance (such as oxides or hydroxides) may easily form on the surface of the power collector. This formation of compounds having high electrical resistance can cause an increase in initial internal resistance of a battery (and eventually impair high output).

With respect to this point, Patent Document 1 describes a technology for providing a layer (conductive layer) containing an organic solvent-soluble polymer (binder) and an electrically conductive material on the surface of a power collector, and using this layer as a barrier layer that inhibits direct contact between water and the power collector to avoid a phenomenon by which the above-mentioned compounds having high electrical resistance are formed when forming an active material layer by applying an aqueous active material composition onto the layer.

Patent Document 1: Japanese Patent Application Laid-open No. 2006-4739

DISCLOSURE OF THE INVENTION

Here, a barrier layer like that described above is required to have water resistance (performance that prevents formation of the above-mentioned compounds having high electrical resistance by inhibiting direct contact between water and the power collector) and electrical conductivity (or in other words, not allowing resistance between the active material layer and power collector layer to become excessively high). However, these two properties are normally in a contradictory relationship. For example, although increasing the content ratio of the conductive material in the barrier layer is advantageous in terms of improving the electrical conductivity of an electrode having that barrier layer, since this leads to a relative decrease in the content ratio of the binder, the water resistance of the barrier layer tends to decrease. Conversely, if the content ratio of the binder is increased in order to improve water resistance of the barrier layer, the content ratio of the conductive material undergoes a relative decrease, and electrical conductivity tends to decrease.

Therefore, an object of the present invention is to more effectively solve problems in the case of manufacturing an electrode (such as a positive electrode for a lithium ion battery) using an aqueous active material composition by providing an electrode that demonstrates stable and high performance even if manufactured using an aqueous active material composition. Another object of the present invention is to provide a method for manufacturing a high-performance electrode using an aqueous active material composition. An additional object of the present invention is to provide lithium ion battery or other battery composed using this electrode, and a vehicle equipped with that battery.

According to the present invention, an electrode (such as a positive electrode for a lithium ion battery) is provided in which an active material layer having an electrode active material as a main component is held by a metallic power collector. This electrode is provided with a barrier layer provided on the surface of the power collector. The barrier layer contains a non-water-soluble polymeric material and a conductive material. The electrode is also provided with an interconnecting layer interposed between the barrier layer and the active material layer. This interconnecting layer contains a polymeric material and a conductive material and has higher electrical conductivity than the barrier layer.

According to an electrode employing this configuration, electrons are efficiently transferred between the barrier layer and the interconnecting layer and between the interconnecting layer and the active material layer by utilizing the highly electrically conductive interconnecting layer provided between the barrier layer and the active material layer. As a result, in comparison with an electrode not having this interconnecting layer (namely, an electrode configured such that the active material layer is formed directly on the barrier layer), resistance between the active material layer and the power collector can be reduced. Thus, even if the content ratio of the non-water-soluble polymeric material (capable of functioning as a film-forming component that contributes to water resistance of the barrier layer) in the barrier layer is comparatively high, decreases in electrical conductivity as a result thereof can be compensated for by providing the interconnecting layer. As a result, a high-performance electrode can be provided in which electrical conductivity between the active material layer and the power collector is improved while ensuring high water resistance for the barrier layer (for example, water resistance capable of adequately practically preventing the formation of compounds having high electrical resistance as described above even in the case of forming the active material layer using an aqueous active material composition). A battery provided with such an electrode is able to demonstrate higher performance (such as higher output).

In the present description, the term "battery" refers to electrical storage devices in general that are able to extract electrical energy, and conceptually includes secondary batteries (including lithium ion batteries, lithium metal secondary batteries, nickel hydrogen batteries, nickel cadmium batteries and all other storage batteries and electrical storage elements such as electrical double-layer capacitors) as well as primary batteries.

In a preferable aspect of the electrode disclosed herein, the electrode is composed so that the relationship between a weight ratio $R_B$ of the conductive material/polymeric material in the barrier layer and a weight ratio $R_C$ of the conductive material/polymeric material in the interconnecting layer satisfies the relationship of $R_B<R_C$. Namely, the interconnecting layer contains the conductive material at a higher ratio than the barrier layer with respect to the weight of the polymeric material contained in each layer. The providing of this interconnecting layer can be useful for forming conductive pathways between the barrier layer and the active material layer. Thus, according to an electrode employing this configuration, electrons are transferred more efficiently between the barrier layer and the active material layer. As a result, an electrode can be provided that demonstrates higher performance.

In another preferable aspect of the electrode disclosed herein, the barrier layer and the interconnecting layer each contain a granular conductive material. The relationship between an average particle diameter $D_B$ of the granular conductive material contained in the barrier layer and an average particle diameter $D_C$ of the granular conductive material contained in the interconnecting layer satisfies the relationship of $D_B>D_C$. Namely, the granular conductive material contained in the interconnecting layer is composed by finer particles than the granular conductive material contained in the barrier layer overall. According to an electrode employing this configuration, a larger number of conductive pathways are formed between the barrier layer and the interconnecting layer, thereby enabling electrons to be transferred efficiently between the layers. As a result, an electrode can be provided that demonstrates higher performance.

In another preferable aspect of the electrode disclosed herein, the active material layer contains a granular conductive material. The relationship between an average particle diameter $D_A$ of the granular conductive material contained in the active material layer and an average particle diameter $D_C$ of the granular conductive material contained in the interconnecting layer satisfies the relationship $D_A>D_C$. Namely, the granular conductive material contained in the interconnecting layer is composed of particles that are finer overall than the granular conductive material contained in the active layer. According to an electrode employing this configuration, a larger number of conductive pathways are formed between the interconnecting layer and the active material layer, thereby enabling electrons to be transferred efficiently between the layers. As a result, an electrode can be provided that demonstrates higher performance.

In another preferable aspect of the electrode disclosed herein, the interconnecting layer contains carbon fibers. At least a portion of the carbon fibers are arranged from the interconnecting layer across the active material layer and/or the barrier layer. According to an electrode employing this configuration, electrons can be efficiently transferred between the barrier layer and the interconnecting layer and/or between the interconnecting layer and the active material layer by passing through the carbon fibers arranged across these layers. As a result, an electrode can be provided that demonstrates higher performance.

According to the present invention, a method is provided for manufacturing an electrode (such as a positive electrode for a lithium ion battery) having a configuration in which an active material layer, which has an electrode active material as a main component, is held by a metallic power collector. This method includes the formation of a barrier layer on the surface of the power collector by applying a composition for forming a barrier layer, which contains a conductive material, a non-water-soluble polymeric material and a solvent that dissolves the polymeric material, to the power collector. This manufacturing method also includes the formation of an interconnecting layer onto the barrier layer by applying a composition for forming an interconnecting layer that contains a conductive material, a polymeric material and a solvent that dissolves the polymeric material thereon. Moreover, this manufacturing method further includes the formation of an active material layer onto the interconnecting layer by applying an aqueous active material composition thereon.

According to this manufacturing method, since the barrier layer is formed on the surface of the power collector prior to applying the active material composition, contact between the aqueous active material composition and the surface of the power collector can be inhibited by the barrier layer. Thus, the formation of compounds having high electrical resistance as described above can be suitably prevented despite using an aqueous active material composition. In addition, as a result of forming the interconnecting layer between the barrier layer and the active material layer, electrons can be efficiently transferred between the barrier layer and the interconnecting layer and between the interconnecting layer and the active material layer by utilizing the interconnecting layer. Thus, a high-performance electrode (and subsequently an electrode enabling the construction of a higher-performance battery) can be manufactured in which increases in resistance between the active material layer and the power collector can be inhibited while ensuring high water resistance for the barrier layer.

In a preferable aspect of the method for manufacturing an electrode disclosed herein, the solvent that composes the composition for forming a barrier layer is an organic solvent. The use of this composition for forming a barrier layer (namely, a solvent-based composition) allows the formation of a barrier layer having better water resistance (for example, that which is able to inhibit contact between water and the surface of the power collector over a longer period of time).

According to the present invention, a battery (such as a secondary battery, and preferably a non-aqueous secondary battery) is provided that is constructed using any of the electrodes disclosed herein. Since a battery composed by using such an electrode prevents the formation of compounds having high electrical resistance as described above on the surface of the power collector that composes the electrode and improves electrical conductivity between the active material layer and the power collector, a battery having higher performance can be obtained. A lithium ion battery constructed using any of the electrodes disclosed herein as a positive electrode is a typical example of a battery provided by the present invention.

According to the present invention, a vehicle is provided that is equipped with any of the lithium ion batteries disclosed herein (any lithium ion battery composed by using any of the electrodes manufactured according to any of the methods disclosed herein for, for example, the positive electrode thereof). The above-mentioned lithium ion battery is able to realize high performance (such as by demonstrating stable, high output) suitable for use as a lithium ion battery installed in a vehicle. Thus, this battery can be preferably used as a power source for a motor installed in a vehicle such as an automobile.

BEST MODE FOR CARRYING OUT THE INVENTION

Figure 1:
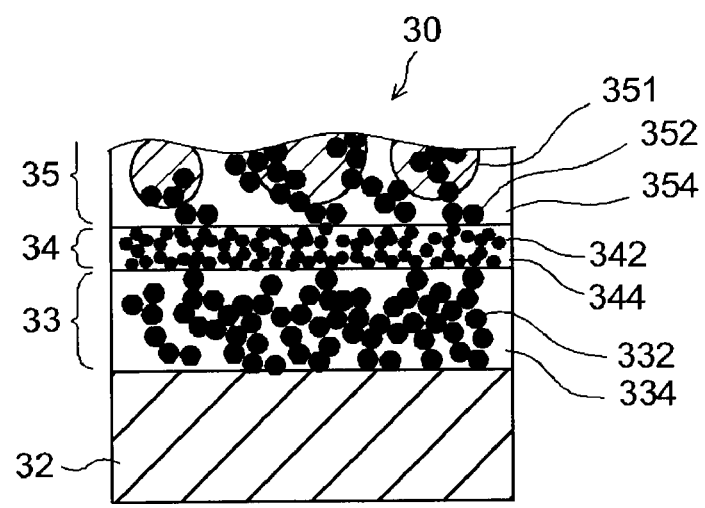
FIG. 1 is a schematic cross-sectional view for explaining the function of an electrode as claimed in an embodiment.

The following provides an explanation of preferred embodiments of the present invention. Those matters required for carrying out the present invention other than those matters specifically mentioned in the present description can be understood to be design matters of a person with ordinary skill in the art based on the prior art in the relevant field. The present invention can be carried out based on the contents disclosed in the present description and technical common sense in the relevant field.

The technology disclosed herein can be, for example, preferably applied to various types of electrodes employing a configuration in which an active material layer is held by a power collector and which are provided with an active material in which liquid properties of an aqueous active material composition easily become alkaline (and typically that in which the liquid properties thereof can be shifted towards alkaline as a result of contacting water) in the case of using the composition to form the active material layer. Typical examples of the active material include lithium ion transition metal oxides such as lithium-nickel-based oxides.

Effects of applying the technology disclosed herein can be demonstrated particularly effectively in the case the material of the power collector that composes the electrode is a material that is able to form a compound that demonstrates high electrical resistance on a surface as a result of contacting an alkaline aqueous composition. Typical examples of such materials include aluminum (Al) and aluminum materials such as alloys (aluminum alloys) having aluminum as a main component thereof. Other examples include amphoteric metals such as zinc (Zn) or tin (Sn) and alloys having any of these metals as a main component thereof.

There are no particular limitations on the shape of the power collector used since it can vary corresponding to the shape of the battery (typically a secondary battery) constructed by using the resulting electrode, and the power collector may have various shapes such as that of a rod, plate, sheet, foil or mesh. The technology disclosed herein can be preferably applied to the manufacturing of an electrode that uses a sheet-like or foil-like power collector, for example. An example of a preferable aspect of a battery constructed using an electrode manufactured according to this method is a battery provided with an electrode body (wound electrode body) composed by typically winding a sheet-like positive electrode and negative electrode with a sheet-like separator. Although there are no particular limitations on the external shape of this battery, it can be in the shape of, for example, a cube, flat plate or cylinder.

A typical example of an electrode to which the technology disclosed herein is preferably applied is a positive electrode for a lithium ion battery employing a configuration in which a lithium transition metal oxide is used as an active material, and an active material layer having the active material as a main component thereof is held by a power collector made of an aluminum material. Although the following provides a more detailed explanation of the present invention by mainly using as examples cases of applying the present invention to a positive electrode for a lithium ion battery, the manufacturing thereof, and a lithium ion battery constructed using the electrode, this is not intended to limit target applications of the present invention to this electrode or battery.

An oxide having a layered structure or an oxide having a spinel structure, which is capable of functioning as a positive electrode active material of this type of lithium ion battery can be suitably selected and used as a lithium transition metal oxide (and typically in granular form) serving as the active material of a positive electrode for a lithium ion battery (main component of the active material layer). For example, one type or two more types of lithium transition metal oxide selected from the group consisting of lithium nickel-based oxides, lithium cobalt-based oxides and lithium manganese-based oxides is used preferably. A particularly preferable target application of the technology disclosed herein in a positive electrode comprising the use of a lithium nickel-based oxide for the positive electrode active material (and typically, the positive electrode active material is substantially composed of lithium nickel-based oxide). Lithium nickel-based oxides tend to enable Li to elute more easily (and thus, the action of causing the liquid properties of an aqueous active material composition to shift towards alkaline is stronger) in the case of being dispersed in an aqueous solvent in comparison with lithium cobalt-based oxides and lithium manganese-based oxides. Thus, in the case of manufacturing a positive electrode using a lithium nickel-based oxide for the positive electrode active material, effects resulting from application of the method disclosed herein can be demonstrated more effectively.

Here, a "lithium nickel-based oxide" refers to oxides having Li and Ni as constituent metal elements thereof, and includes complex oxides containing one type or two or more types of metal elements other than Li and Ni (namely, transition metal elements and/or typical metal elements other than Li and Ni) at a ratio lower than that of Ni (based on atomic number, and referring to a ratio lower than Ni for all metal elements other than Li and Ni in the case of containing two or more types of such metal elements other than Li and Ni). Examples of such metal elements include one type or two or more types of elements selected from the group consisting of Co, Al, Mn, Cr, Fe, V, Mg, Ti, Zr, Nb, Mo, W, Cu, Zn, Ga, In, Sn, La and Ce. Similarly, a "lithium cobalt-based oxide" includes complex oxides containing one type or two or more types of metal elements other than Li and Co at a ratio lower than that of Co, and "lithium manganese-based oxides" include complex oxides containing one type or two or more types of metal elements other than Li and Mn at a ratio lower than that of Mn.

A lithium transition metal oxide powder (hereinafter to also be referred to as an active material powder), for example, can be used as is for this type of lithium transition metal oxide (typically in granular form). For example, a lithium transition metal oxide powder substantially composed of secondary particles having an average particle diameter of about 1 to 25 μm (and typically about 2 to 15 μm) can be preferably employed for the positive electrode active material in the technology disclosed herein.

The positive electrode active material used in the method disclosed herein can be an aqueous composition in a form in which this type of active material is dispersed in an aqueous solvent. In addition, the positive electrode active material disclosed herein can be formed using this aqueous composition. Here, an "aqueous solvent" is a concept that refers to water or a mixed solvent consisting mainly of water. One type or two or more types of organic solvents able to uniformly mix with water (such as a lower alcohol or lower ketone) can be suitably selected and used as a solvent other than water that composes the mixed solvent. For example, an aqueous solvent in which about 80% or more (and more preferably about 90% by weight or more and even more preferably about 95% by weight or more) of the aqueous solvent is water is used preferably. A particularly preferable example is an aqueous solvent substantially composed of water. Although there are no particular limitations thereon, the solid content of the positive electrode active material composition (ratio of a non-volatile fraction, namely the component that forms that active material layer) can be, for example, about 40 to 60% by weight.

The above-mentioned positive electrode active material composition typically contains a conductive material that enhances electrical conductivity of the positive electrode active material layer formed from the composition in addition to the positive electrode active material and the aqueous solvent. A carbon material such as carbon powder or carbon fibers, for example, is preferably used for the conductive material. Alternatively, an electrically conductive metal powder such as nickel powder and the like may also be used. One type thereof may be used or two or more types may be used in combination. Examples of carbon powder that can be used include various types of carbon black (such as acetylene black, furnace black or Ketjen black) and graphite powder. Among these, acetylene black can be used preferably. For example, a granular conductive material (for example, a granular carbon material such as acetylene black) having an average particle diameter of the constituent particles thereof (and typically primary particles) within the range of about 10 to 200 nm (and, for example, 20 to 100 nm) is used preferably.

In addition, the above-mentioned positive electrode active material composition can contain one type or two or more types of materials capable of being incorporated in positive electrode active material compositions (and typically aqueous compositions) during the manufacturing of ordinary lithium ion battery electrodes as necessary. Examples of such materials include various types of polymeric materials able to function as binders of positive electrode active materials. A polymeric material conventionally used as a binder in the preparation of aqueous active material compositions can be suitably selected and used for this polymeric material. Polymeric materials that are substantially insoluble in organic solvent but which dissolve or disperse in water are used preferably. Examples of (water-soluble) polymeric materials that dissolve in water include water-soluble polymers including cellulose derivatives such as carboxymethyl cellulose (CMC), methyl cellulose (MC), cellulose acetate phthalate (CAP), hydroxypropyl methylcellulose (HPMC) or hydroxypropyl methylcellulose phthalate (HPMCP), and polyvinyl alcohol (PVA). Among these, CMC can be used preferably. In addition, examples of (water-dispersible) polymeric materials that disperse in water include fluorine-based resins such as polytetrafluoroethylene (PTFE), tetrafluoroethylene-perfluoroalkyl vinyl ether copolymer (PFA), tetrafluoroethylene-hexafluoropropylene copolymer (FEP) or ethylene-tetrafluoroethylene copolymer (ETFE), vinyl acetate copolymer, styrene-butadiene block copolymer (SBR), acrylic acid-modified SBR resin (SBR-based latex) and gums such as gum arabic. In particular, fluorine-based resins such as PTFE can be used preferably. One type of such polymeric materials may be used alone or two or more types may be used in combination.

The ratio of the positive electrode active material in the entire positive electrode active material layer (and typically generally coinciding with the ratio of the positive electrode active material in the solid content of the positive electrode active material composition) is preferably about 50% by weight or more (and typically 50 to 95% by weight) and more preferably about 75 to 90% by weight. In a positive electrode active material layer containing a conductive material, the ratio of the conductive material in the active material layer can be, for example, about 3 to 25% by weight and preferably about 3 to 15% by weight. In this case, the ratio of the positive electrode active material in the active material layer is suitably about 80 to 95% by weight (and for example, 85 to 95% by weight).

In addition, in a composition containing components that form the positive electrode active material layer other than the positive electrode active material and the conductive material (such as a polymeric material), the ratio of the total content of these optional components (ratio among all components that form the positive electrode active material layer) is preferably about 7% by weight or less and more preferably about 5% by weight or less (and for example, 1 to 5% by weight). The ratio of the total content of the optional components may also be about 3% by weight or less (and for example, 1 to 3% by weight).

In the method disclosed herein, a power collector is prepared that is preliminarily provided with a barrier layer and interconnecting layer in that order, and the above-mentioned positive electrode active material composition is then applied onto the interconnecting layer to form an active material layer. The following provides an explanation of a method for composing and forming the barrier layer and the interconnecting layer.

The barrier layer contains a non-water-soluble polymeric material (and typically a polymeric material that is substantially insoluble in neutral to alkaline water). One type or two or more types of materials capable of forming a water-resistant film on the surface of the power collector can be suitably selected and used for this non-water-soluble polymeric material. A material having resistance to an electrolyte (typically a liquid electrolyte) of a battery constructed using an applicable electrode (and typically a lithium ion battery) or a battery reaction, is used preferably. Examples of such non-water-soluble polymeric materials that can be used include polyvinylidene fluoride (PVDF), polyvinylidene chloride (PVDC), polyethylene oxide (PEO), polypropylene oxide (PPO) and polyethylene oxide-polypropylene oxide copolymer (PEO-PPO). PVDF is used particularly preferably.

Materials similar to conductive materials listed as examples of constituent components of the active material composition (active material layer) can be preferably used as conductive materials used to compose the barrier layer. One type of these materials may be used alone or two or more types may be used in combination. For example, a granular conductive material (for example, a granular carbon material such as acetylene black) having an average particle diameter of the constituent particles (and typically, primary particles) within the range of about 10 to 200 nm (and for example, about 20 to 100 nm) is used preferably.

The barrier layer can typically be formed by applying a composition for forming the barrier layer, prepared by adding and mixing the above-mentioned conductive material and non-water-soluble polymeric material in a suitable solvent (and typically, a solvent capable of dissolving the polymeric material), to the surface of the power collect and drying. The solvent that composes the composition can be suitably selected in consideration of the combination with the non-water-soluble polymeric material used. An organic solvent (non-aqueous solvent) used to prepare conventional pastes for forming a solvent-based active material layer can be used preferably. Examples of such organic solvents include N-methyl-2-pyrrolidone (NMP), methyl ethyl ketone and toluene. Among these, NMP, for example, can be used preferably. Although there are no particular limitations thereon, the solid content of the composition for forming the barrier layer can be, for example, about 1 to 30% by weight (and preferably about 5 to 15% by weight). If this solid content is excessively high, handling ease of the composition for forming the barrier layer (for example, coatability when applying the composition to the power collector (and particularly to a foil-like power collector)) decreases easily. In addition, if the solid content is excessively low, the amount of organic solvent used increases, thereby tending to increase costs.

The weight ratio $R_B$ of the conductive material to the polymeric material in the barrier layer (and typically, generally coinciding with the weight ratio of the conductive material to the polymeric material contained in the composition for forming the barrier layer) can be, for example, about 50/50 or less (and typically, about 5/95 to 50/50), and preferably about 30/70 or less (and typically, about 10/90 to 30/70). If $R_B$ is larger than the above-mentioned range, the water resistance of the barrier layer tends to decrease. On the other hand, if $R_B$ is smaller than the above-mentioned range, it becomes difficult to ensure adequate conductive pathways in the barrier layer, and electrical conductivity of the electrode tends to decrease.

A conventionally known, suitable coating device (such as a slit coater, die coater, comma coater or gravure coater) can be preferably used for carrying out the procedure for applying the composition for forming the barrier layer to the power collector surface. The barrier layer is formed by drying the coated composition after coating (and at this time, suitable drying promoting means (such as a heater) may be used as necessary). Although there are no particular limitations on the coated amount of composition for forming the barrier layer, if the coated amount is excessively low, the water resistance of the formed barrier layer tends to decrease easily, while if the coated amount is excessively high, the electrical conductivity of the barrier layer (and ultimately that of the electrode) tends to decrease. In consideration of this balance between water resistance and electrical conductivity, normally the coated amount is suitably about 0.1 to 10 $g/m^2$ (based on the solid content) per side of the power collector, and is preferably, for example, about 1 to 5 $g/m^2$ (based on the solid content).

In the technology disclosed herein, an interconnecting layer containing a polymeric material and a conductive material is interposed between the barrier layer and the active material layer. A material similar to the conductive materials listed as examples of constituents of the active material composition (active material layer) can be preferably used for the conductive material that composes the interconnecting layer. One type of these materials may be used alone or two or more types may be used in combination. For example, carbon black such as acetylene black (granular conductive material, and typically a granular carbon material) can be used preferably. A conductive material in which the average particle diameter of the constituent particles (and typically, primary particles) is within the range of about 5 to 100 nm (for example, 10 to 50 nm) is used preferably. In addition, another preferable example of a conductive material used in the interconnecting layer is a fibrous conductive material (for example, a fibrous carbon material) such as carbon fibers. Examples of carbon fibers include ordinary carbon fibers such as PAN-based or pitch-based carbon fibers, as well as carbon nanotubes (either single layer or multi-layer) and carbon fibers synthesized using a vapor phase method (so-called vapor grown carbon fibers such as "VGCF" carbon fibers (trade name) available from Showa Denko K.K. For example, a fibrous carbon material having a fiber length of about 10 to 20 μm can be preferably used as a conductive material of the interconnecting layer. A granular conductive material and a fibrous conductive material may also be used in combination at an arbitrary ratio.

The interconnecting layer can typically be formed by applying a composition for forming the interconnecting layer, prepared by adding and mixing the conductive material and the polymeric material in a suitable solvent, onto the barrier layer followed by drying. The polymeric material is only required to be that which is capable of adhering the conductive material that composes the interconnecting layer, and may be water-soluble or water-insoluble (such as that which is soluble in organic solvent). For example, one type or two or more types of polymeric materials can be used that are selected from water-soluble polymeric materials or water-dispersible polymeric materials listed as examples of constituent components of the active material layer composition (active material composition), or non-water-soluble polymeric materials listed as examples of constituent components of the barrier layer.

In addition, the solvent that composes the composition for forming the interconnecting layer may be an aqueous solvent (such as the above-mentioned aqueous solvent) or organic solvent (such as the above-mentioned organic solvent), and can be suitably selected in consideration of combination with the polymeric material used. For example, the amount of organic solvent used to manufacture an electrode can be reduced by using an aqueous solvent (and typically, water) for the solvent that composes the composition for forming the interconnecting layer (namely, by using an aqueous composition for forming the interconnecting layer). In addition, in the case of using an organic solvent for the solvent that composes the composition for forming the interconnecting layer (namely, using a solvent-based composition for forming the interconnecting layer, since the interconnecting layer formed from the composition demonstrates hydrophobic properties overall, contact between an aqueous active material composition and the surface of the power collector can be more effectively inhibited. Solvents similar to those listed as examples of organic solvents for use as constituents of the barrier layer (such as NMP) can be preferably used as organic solvents. Although there are no particular limitations thereon, the solid content of the composition for forming the interconnecting layer can be, for example, about 40 to 60% by weight.

The weight ratio $R_C$ of conductive material to polymeric material in the interconnecting layer (and typically, generally coinciding with the weight ratio of the conductive material to polymeric material contained in the composition for forming the interconnecting layer) is preferably larger than the above-mentioned ratio $R_B$ of the barrier layer, and can be, for example, about 70/30 or more (and typically, about 70/30 to 99.5/0.5). This weight ratio $R_C$ is more preferably about 80/20 or more (and typically, about 80/20 to 99/1). If $R_C$ is larger than the above-mentioned range, adhesion of the conductive material (formability of the interconnecting layer) tends to be inadequate. On the other hand, if $R_C$ is smaller than the above-mentioned range, the effect of the interconnecting layer of improving electrical conductivity tends to diminish. Normally, if the $R_C$ of the interconnecting layer is larger than $R_B$ of the barrier layer (for example, $R_C/R_B$ of about 5 or more and preferably about 10 or more), then the interconnecting layer is presumed to have higher electrical conductivity than the barrier layer.

A procedure for forming the interconnecting layer by applying the composition for forming the interconnecting layer onto the barrier layer (and typically, including a composition coating procedure and a coated composition drying procedure) can be carried out in the same manner as the procedure for forming the barrier layer by applying the composition for forming the barrier layer onto the surface of the power collector. Although there are no particular limitations thereon, if the coated amount of the composition for forming the interconnecting layer is excessively low, the effect of arranging the interconnecting layer (effect of improving the electrical conductivity of the electrode) tends to be diminished. On the other hand, if the coated amount is excessively high, the amount of active material contained per unit volume of the electrode decreases, and as a result thereof, the capacity per unit volume of the electrode (and ultimately that of the battery that is constructed using that electrode) tends to decrease. Thus, normally the coated amount is suitably about 0.5 to 3 g/m$^2$ (based on the solid content) per side of the power collector, and preferably, for example, 1 to 2 g/m$^2$ (based on the solid content).

The procedure for forming the active material layer by applying the active material composition onto this interconnecting layer (and typically, including a composition coating procedure and a coated composition drying procedure) can be carried out in the same manner as the procedure for forming the barrier layer by applying the composition for forming the barrier layer onto the surface of the power collector. Although there are no particular limitations thereon, the coated amount of the active material composition can suitably differ corresponding to the shape and application of electrode and battery. For example, the ratio of the total thickness of the barrier layer and interconnecting layer to the thickness of the active material layer ((barrier layer+interconnecting layer): active material layer) is preferably such that the active material layer is formed comparatively thick so that the ratio is generally 1:5 to 1:100 (and typically referring to the thickness ratio after pressing).

A positive electrode sheet of a target thickness can be obtained by pressing a laminate (positive electrode) obtained in this manner in the direction of thickness. A conventionally known roll press method or plate press method and the like can be suitably employed for the method used to carry out the above-mentioned pressing.

The conductive material contained in the barrier layer and the conductive material contained in the interconnecting layer may be the same type of material (such as acetylene black in both cases) or different types of materials (such as a combination of acetylene black and Ketjen black or a combination of acetylene black and carbon fibers). In addition, the size of the conductive material contained in the barrier layer and the conductive material contained in the interconnecting layer (which can be compared on the basis of average particle diameter in the case of using granular conductive materials for both, or fiber length or aspect ratio and the like in the case of using fibrous conductive materials for both) may be the same or different.

In the case the barrier layer and the interconnecting layer both contain a granular conductive material (and typically, the same type of conductive material such as acetylene black), the granular conductive material is preferably selected so that the relationship between average particle diameter $D_B$ of the granular conductive material contained in the barrier layer and average particle diameter $D_C$ of the granular conductive material contained in the interconnecting layer satisfies the relationship $D_B > D_C$. For example, in the case of using a granular conductive material having an average particle diameter $D_B$ of 20 to 100 nm (and typically, 40 to 60 nm) as the granular conductive material for the barrier layer, a granular conductive material having an average particle diameter $D_C$ that is about 90% or less of the above-mentioned $D_B$ (namely, $D_C/D_B$ is 90% or less and typically about 10 to 90%), and preferably 80% or less (and typically, about 20 to 80% and for example, about 30 to 70%), can be preferably used as the granular conductive material for the interconnecting layer.

In addition, in the case the active material layer contains a conductive material, the conductive material may be the same type of material or a different type of material as that contained in the barrier layer or interconnecting layer. In addition, the size of the conductive material contained in the active material layer may be the same as or different from the size of the conductive material contained in the barrier layer or interconnecting layer.

In the case the active material layer and the interconnecting layer both contain a granular conductive material (and typically, the same type of conductive material such as acetylene black), the granular conductive material is preferably selected such that the relationship between the average particle diameter $D_A$ of the granular conductive material contained in the active material layer and the average particle diameter $D_C$ of the granular conductive material contained in the interconnecting layer satisfies the relationship $D_A > D_C$. For example, in the case a conductive material in which the average particle diameter $D_A$ is 20 to 100 nm (and typically, 40 to 60 nm) is used as the granular conductive material for the active material layer, a granular constructive material having an average particle diameter $D_C$ that is about 90% or less of the above-mentioned $D_A$ (namely, $D_C/D_A$ is 90% or less and typically about 10 to 90%), and preferably 80% or less (and typically, about 20 to 80% and for example, about 30 to 70%), can be preferably used as the granular conductive material for the interconnecting layer.

In the case the interconnecting layer employs a composition that contains a fibrous conductive material (such as vapor grown carbon fibers), at least a portion of the fibrous conductive material (namely, a portion of the fibers that compose the conductive material) are preferably arranged extending from the interconnecting layer across the active material layer and/or the barrier layer. According to such a configuration in which electrically conductive fibers are penetrating into the active material layer and/or barrier layer from the interconnecting layer, electrons are able to efficiently migrate between the barrier layer and the interconnecting layer and/or between the interconnecting layer and the active material layer through the electrically conductive fibers. For example, in the case the composition for forming the barrier layer and the composition for forming the interconnecting layer are both solvent-based compositions (and preferably compositions using the same type of organic solvent, such as NMP), as a result of coating the composition for forming the interconnecting layer onto the barrier layer, the vicinity of the surface of the barrier layer (interface with the interconnecting layer) partially dissolves or swells and a portion of the conductive material fibers in the composition for forming the interconnecting layer are able to enter this portion. By then drying the composition for forming the interconnecting layer while in this state, a portion of the fibrous carbon material is able to be arranged extending from the interconnecting layer across the barrier layer. In addition, in the case, for example, the composition for forming the interconnecting layer and the active material composition are both aqueous compositions, by coating the active material composition onto the interconnecting layer, the vicinity of the surface of the interconnecting layer partially dissolves or swells and a portion of the fibrous conductive material contained in this portion is able to enter the active layer composition. By then drying the active layer composition while in this state, a portion of the fibrous conductive material (a portion of which is able to be fibers that have entered the barrier layer) can be arranged extending from the interconnecting layer across the active material layer. In order to allow the fibrous conductive material in the composition for forming the interconnecting layer to enter the layers above and below in this manner, it is preferable to increase the ratio of the fibrous conductive material in the solid content of the composition (for example, such that Rc is 80/20 or more and more preferably 90/10 or more).

In the case of using a carbon material (such as a fibrous or granular carbon material) for the conductive material used to manufacture an electrode, a material having a low volatile content is preferably selected for the carbon material (such as acetylene black). A low volatile content of the carbon material can be correlated to a small number of functional groups on the surface of the carbon material. A carbon material having a small number of functional groups on the surface thereof is preferable since action causing the generation of gas due to contact between the carbon material and electrolyte (and typically, a liquid electrolyte) tends to be low, for example when constructing a battery using the carbon material and carrying out conditioning in accordance with ordinary methods (and as a result, there is little gas generated by conditioning). For example, a carbon material is preferably used in which the volatile content as measured in compliance with JIS K6221 is about 1% or less (and typically, about 0.1 to 1%).

A preferable aspect for manufacturing an electrode (such as a positive electrode for a lithium ion battery) according to the manufacturing method disclosed herein is as described below when explained according to the electrode cross-sectional drawing shown in FIG. 1 (showing only one side of power collector) and the flow chart shown in FIG. 2. Namely, a power collector (such as an aluminum foil) 32 is first prepared (Step S100). A solvent-based composition for forming a barrier layer containing a conductive material 332 and a polymeric material 334 is then applied to one side or both sides of the power collector 32 followed by drying the applied composition to form a barrier layer 33 (Step S110). Next, a solvent-based composition for forming an interconnecting layer, for example, containing a conductive material 342 and a polymeric material 344 is then applied onto the barrier layer 33 formed in Step S110 followed by drying the applied composition to form an interconnecting layer 34 (Step S120). Moreover, an aqueous active material composition containing an active material (such as lithium nickel-based oxide powder) 351, a conductive material 352 and a polymeric material 354 is then applied onto the interconnecting layer 34 formed in Step S120 followed by drying the applied composition to form an active material layer 35 (Step S130). Subsequently, the entire laminate may be pressed or cut to a desired size as necessary to obtain an electrode 30 of a target thickness and size.

Here, the amount of time from applying the active layer composition to drying up the applied composition can be set in consideration of the degree of water resistance of the barrier layer that composes the electrode. For example, the active layer composition is dried in a shorter amount of time than the duration of water resistance of the barrier layer (which can be determined from a water resistance test as described in the following examples). As a result thereof, a high-performance electrode (for example, an electrode in which formation of the previously described compounds having high electrical resistance is more effectively prevented, or in other words, an electrode that is suitable for constructing a high-output battery) can be stably manufactured. A preferable practical aspect of an electrode disclosed herein from viewpoints such as electrode production efficiency or degree of freedom in designing the production line is a barrier layer that realizes water resistance (duration of water resistance) of about 3 minutes or more in the water resistance test described in the following examples. A barrier layer in which the duration of water resistance is about 3.5 minutes or more is more preferable. In addition, a barrier layer in which membrane resistance as determined by measurement of membrane resistance described in the following examples is 10 m$\Omega$/cm$^2$ or less (and more preferably 8 m$\Omega$/cm$^2$ or less) is preferable.

Figure 2:
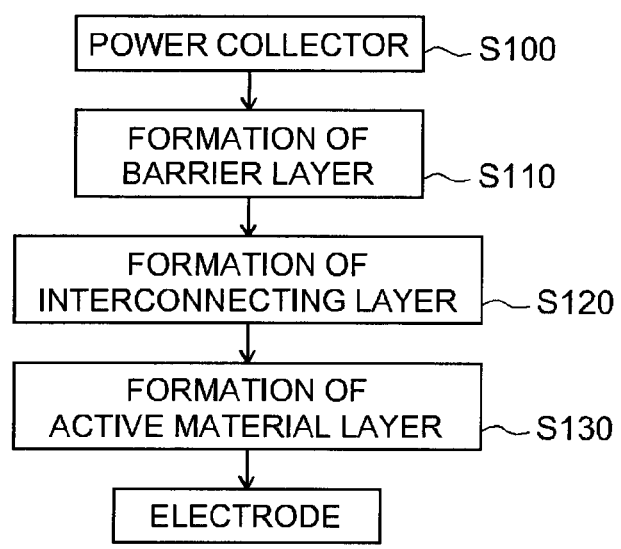
FIG. 2 is a flow chart showing an example of a general method for manufacturing an electrode as claimed in an embodiment.
Figure 3:
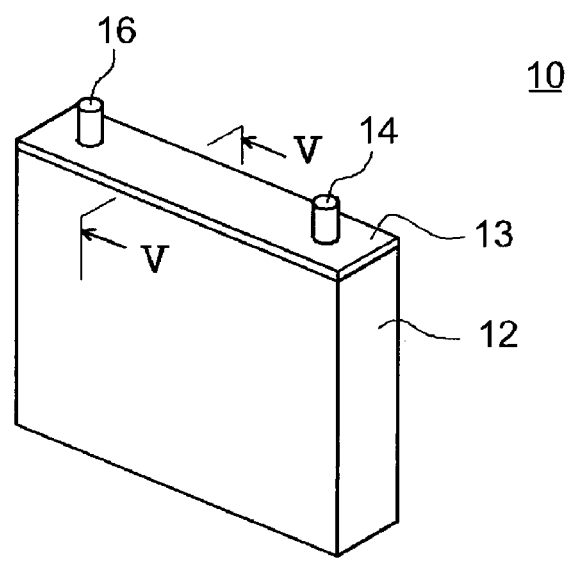
FIG. 3 is a schematic perspective view showing a battery as claimed in an embodiment.

In an electrode formed in this manner, as a result of the interconnecting layer 34, which has a higher conductive material concentration than the barrier layer 33 and the active material layer 35, being interposed between the barrier layer 33 and the active material layer 35 as shown in the schematic cross-sectional view shown in FIG. 1, for example, a larger number of conductive pathways are formed between the barrier layer 33 and the active material layer 35 through the conductive material 342 contained in the interconnecting layer 34, thereby enabling electrons to migrate more efficiently (or in other words, enabling interfacial resistance to be decreased) between both layers 33 and 35 (and typically, migrate between the conductive materials 332 and 335 contained in these layers). A conductive material having a smaller (finer) average particle diameter than the conductive materials 332 and 352 contained in the barrier layer 33 and the active material layer 35 is preferably used for the conductive material 342 contained in the interconnecting layer 34. As a result, a larger amount of conductive material (for example, a larger amount of granular conductive material) 342 can be present at the interface between the interconnecting layer 34 and the barrier layer 33 and at the interface between the interconnecting layer 34 and the active material layer 35. As a result, electrons can migrate more efficiently between the barrier layer 33 and the active material layer 35.

The electrode provided by the present invention is preferably used as an electrode (such as a positive electrode) for constructing various types of batteries. For example, the electrode provided by the present invention is preferable for use as a constituent of a lithium ion battery provided with a positive electrode composed by using the above-mentioned electrode, a negative electrode in which a negative electrode active material is held by a negative electrode power collector, an electrolyte arranged between the positive and negative electrodes, and typically a separator that isolates the positive and negative electrode power collectors (and which is unnecessary in the case of a solid electrolyte). There are no particular limitations on the size of the structure of the outer casing (such as a metal casing or laminated film structure) that composes the battery, or on the structure of the electrode bodies having the positive and negative electrode power collectors as main constituents thereof (such as a wound structure or laminated structure).

The following provides an explanation of an embodiment of a positive electrode provided by the present invention and a lithium ion battery provided with that positive electrode with reference to the schematic diagrams shown in FIG. 1 and FIGS. 3 to 5.

As shown in the drawings, a lithium ion battery 10 of the present embodiment is provided with a case (outer casing) 12 made of metal (and preferably also made of plastic or laminated film), and a wound electrode body 20, composed by laminating a positive electrode sheet 30 in the form of a long sheet, a separator 50A, a negative electrode sheet 40 and a separator 50B in that order followed by winding into a flat shape, is housed within this case 12.

The positive electrode 30 is manufactured by applying any of the technologies disclosed herein, and is provided with the positive electrode power collector 32 in the form of a long sheet, the barrier layer 33, which is formed on one or both sides of the power collector (see FIG. 1), the interconnecting layer 34 formed on the barrier layer (see FIG. 1), and the positive electrode active material layer 35 formed on the interconnecting layer. Typically, these layers 33, 34 and 35 are preferably formed over roughly the same area (so as to be mutually roughly completely overlapping) of the positive electrode power collector 32. Alternatively, the barrier layer 33 may be provided over a wider area than the active material layer 35, for example. The barrier layer 33 is preferably provided so as to include the entire area over which the active material layer 35 is formed. Although the area over which the interconnecting layer 34 is formed preferably includes roughly the same area or the entire area over which the barrier layer 33 and the active material layer 35 overlap, it may also be formed over a portion of the area over which they overlap (preferably about 50% or more, more preferably about 70% or more, and even more preferably about 90% or more of the overlap area).

On the other hand, the negative electrode 40 is provided with a negative electrode power collector 42, in the form of a long sheet, and a negative electrode active material layer 45 formed on the surface thereof. A sheet material composed of a metal such as copper (and typically a metal foil such as copper foil) can be preferably used for the negative electrode power collector 42. A carbon material (such as natural graphite) containing a graphite structure (layered structure) in at least a portion thereof can be preferably used for the negative electrode active material. This type of negative electrode active material is mixed with a binder (for which a material similar to the polymeric material used in the active material layer on the positive electrode side can be used) and a conductive material used as necessary (for which a material similar to that used in the active material layer on the positive electrode side can be used), and the prepared negative electrode active material composition (and preferably an aqueous composition) is coated onto one side or both sides of the negative electrode power collector 42. By then drying the coated composition, the negative electrode active material layer 45 can be formed at a desired location on the power collector 42 (see FIG. 4). Although there are no particular limitations thereon, the amount of binder used based on 100 parts by weight of the negative electrode active material can be within the range of, for example, 5 to 10 parts by weight.

In addition, a porous film composed of a polyolefin-based resin such as polyethylene or polypropylene, for example, can be preferably used for the separators 50A and 50B used by overlapping with the positive and negative electrode sheets.

Figure 4:
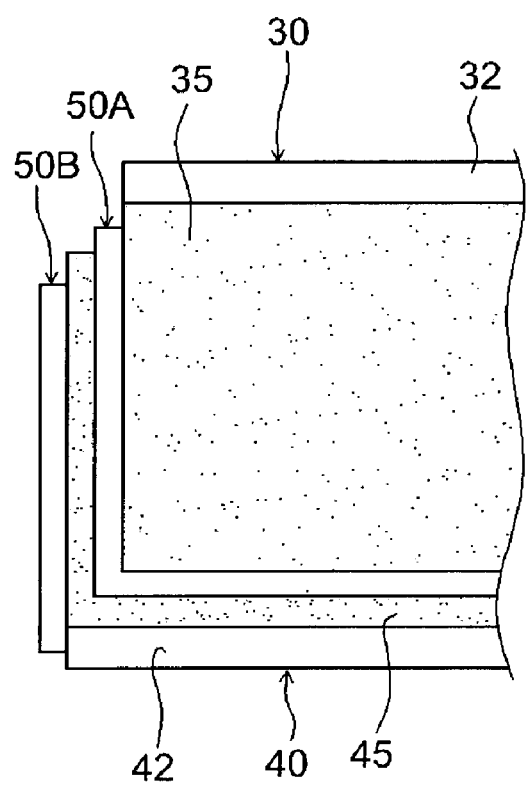
FIG. 4 is a schematic overhead view showing a positive electrode, negative electrode and separators that compose a battery as claimed in an embodiment.
Figure 5:
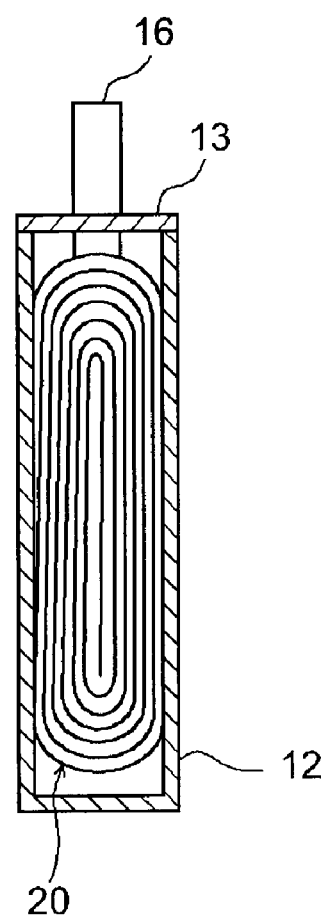
FIG. 5 is a cross-sectional view taken along line V-V of FIG. 3.

As shown in FIG. 4, one of the ends along the lengthwise direction of the positive electrode sheet 30 and the negative electrode sheet 40 are not coated with the above-mentioned active material composition, resulting in the formation of portions where the active materials 35 and 45 are not formed. When overlapping the positive and negative electrode sheets 30 and 40 with the two separators 50A and 50B, the positive and negative electrode sheets 30 and 40 are overlapping after shifting the positions thereof slightly so that simultaneous to both active material layers 35 and 45 being made to overlap, the portion of the positive electrode sheet where the active material layer is not formed and the portion of the negative electrode sheet where the active material layer is not formed are separately arranged on one end and the other end along the lengthwise direction. The flat-shaped wound electrode body 20 is then obtained by winding the total of four sheets 30, 40, 50A and 50B while in this state, and then crushing the resulting wound electrode body by pressing from the side.

Next, together with housing the resulting wound electrode body 20 in the case 12 (FIG. 5), the above-mentioned portions of the positive electrode and negative electrode where the active material layer is not formed are respectively electrically connected to a positive electrode terminal 14 for external connection and a negative electrode terminal 16 for external connection, a portion of which are arranged outside the case 12. A suitable non-aqueous electrolyte (such as that in which a suitable amount of a lithium salt (supporting salt) such as $LiPF_6$ is dissolved in a mixed solvent of, for example, ethylene carbonate (EC) and diethyl carbonate (DEC)) is arranged (poured) within the case 12, and the opening of the case 12 is sealed by welding the case to a cover member 13 corresponding thereto to complete construction (assembly) of the lithium ion battery 10. The process for sealing the case 12 and the process for arranging (pouring) the electrolyte may be the same as techniques carried out in the manufacturing of conventional lithium ion batteries, and are not intended to characterize the present invention.

Although the following provides an explanation of several examples relating to the present invention, the present invention is not limited to that indicated in these specific examples.

Example 1

A sheet-like electrode was produced having aluminum foil for the power collector and a lithium nickel-based oxide (lithium nickel oxide) of a composition in which the positive electrode active material is represented by $LiNiO_2$.

Namely, acetylene black (conductive material) having an average particle diameter of 48 nm and PVDF (polymeric material) were mixed with NMP (organic solvent) so that the weight ratio ($R_B$) of the conductive material to the polymeric material was about 30/70 and the solid content was about 10% by weight to prepare a solvent-based composition for forming a barrier layer.

In addition, acetylene black (conductive material) having an average particle diameter of 48 nm and PVDF (polymeric material) were mixed with NMP so that the weight ratio (Rc) of the conductive material to the polymeric material was about 90/10 and the solid content was about 20% by weight to prepare a composition (solvent-based) for forming an interconnecting layer as claimed in the present example.

In addition, lithium nickel oxide powder (positive electrode active material), acetylene black (conductive material) having an average particle diameter of 48 nm, and CMC (polymeric material) were mixed with ion exchange water so that the weight ratio of these materials was 87:10:3 and the solid content was about 45% by weight to prepare an aqueous active material composition.

The composition for forming a barrier layer was coated onto both sides of a long piece of aluminum foil (power collector) having a thickness of 15 μm and dried to form barrier layers on both sides of the power collector. At this time, the coated amount (basis weight) of the composition for forming a barrier layer was adjusted to about 2 g/m² (based on the solid content) per side of the power collector.

Next, the composition for forming an interconnecting layer was coated over the barrier layers on the power collector on which the barrier layers were formed followed by drying to respectively form the interconnecting layer on each barrier layer. At this time, the coated amount of the composition for forming an interconnecting layer was adjusted to about 1.5 g/m² (based on the solid content) per side.

Subsequently, the active material composition was coated over the interconnecting layers onto the power collector on which the barrier layers and interconnecting layers were formed followed by drying to respectively form an active material layer on each interconnecting layer. The coated amount (based on the solid content) of the active material composition was adjusted to about 12.8 g/m² for both sides combined. In addition, the drying conditions for the coated active material composition were set such that the time required for the active material composition to become nearly completely dry after being applied to the power collector (and more specifically, the surfaces of the interconnecting layers) was within about 3 minutes.

With the active layer composition having been dried, the total thickness, including the power collector and the electrode films formed thereon (barrier layer, interconnecting layer and active material layer), was about 82 μm. The resulting laminate was then pressed so that the total thickness thereof was about 64 μm (so that a thickness compression ratio as defined by "total thickness before pressing/total thickness after pressing" was 0.78). A sheet-like electrode (electrode sheet) as claimed in the present example was produced in this manner.

Example 2

In this example, the acetylene black and PVDF were mixed with NMP at the weight ratio ($R_C$) of about 95/5 in the preparation of the composition for forming an interconnecting layer. An electrode sheet as claimed in Example 2 was then produced in the same manner as Example 1 with respect to other aspects.

Example 3

In this example, the acetylene black and PVDF were mixed with NMP at the weight ratio ($R_C$) of about 97/3 in the preparation of the composition for forming an interconnecting layer. An electrode sheet as claimed in Example 3 was then produced in the same manner as Example 1 with respect to other aspects.

Example 4

In this example, acetylene black having an average particle diameter of 30 nm was used instead of the acetylene black having an average particle diameter of 48 nm in the preparation of the composition for forming an interconnecting layer. An electrode sheet as claimed in Example 4 was then produced in the same manner as Example 3 with respect to other aspects. Namely, acetylene black having an average particle diameter of 48 nm in the same manner as Examples 1 to 3 was used to form the barrier layer and the active material layer.

Example 5

In this example, acetylene black having an average particle diameter of 16 nm was used instead of the acetylene black having an average particle diameter of 48 nm in the preparation of the composition for forming an interconnecting layer. An electrode sheet as claimed in Example 5 was then produced in the same manner as Example 3 with respect to other aspects (and thus, the acetylene black having an average particle diameter of 48 nm in the same manner as Examples 1 to 3 was used to form the barrier layer and the active material layer).

Example 6

In this example, the active material layer was formed by coating the active material composition directly onto the barrier layer (namely, without forming the interconnecting layer) after having formed the barrier layer in the same manner as Example 1. An electrode sheet as claimed in Example 6 was then prepared in the same manner as Example 1 with respect to other aspects.

[Evaluation of Electrode Performance]

Two of each of the electrode sheets as claimed in Examples 1 to 6 were overlapped followed by applying a pressure of 2500 N and measuring sheet resistance (Ω·cm²) using the four-point probe method in compliance with JIS K7194 while in this state. The results are shown in Table 1. Table 1 also shows the general composition of each electrode sheet. Furthermore, "AB" in Table 1 indicates acetylene black.

TABLE 1

| | Barrier layer | Interconnecting layer | | Active material layer | |
|---|---|---|---|---|---|
| | AB average particle diameter | Composition (weight ratio) AB | PVDF | AB average particle diameter | AB average particle diameter | Sheet resistance (mΩ·cm²) |
| Example 1 | 48 nm | 90 | 10 | 48 nm | 48 nm | 50 |
| Example 2 | " | 95 | 5 | " | " | 48 |
| Example 3 | " | 97 | 3 | " | " | 44 |
| Example 4 | " | " | " | 30 nm | " | 37 |
| Example 5 | " | " | " | 16 nm | " | 35 |
| Example 6 | " | (no interconnecting layer) | | | " | 73 |

As shown in Table 1, in comparison with the electrode sheet of Example 6 in which the active material layer was formed directly on the barrier layer (and not having an interconnecting layer), the electrode sheets as claimed in Examples 1 to 5, in which the interconnecting layer was arranged between the barrier layer and the active material layer, were able to reduce sheet resistance by 30% or more. These electrode sheets of Examples 1 to 6 all had barrier layers of the same composition. Thus, electrode conductivity was confirmed to be able to improved without sacrificing performance of the barrier layer (and typically, performance that inhibits contact between the aqueous active material composition and the power collector) by providing the interconnecting layer.

Furthermore, a water resistance test as described below was carried out on the barrier layers provided in the electrode sheets as claimed in Examples 1 and 6 (of which all had the same composition).

Namely, a test piece for evaluation of water resistance was produced by forming a barrier layer on both sides of a power collector at about 2 g/m² (based on the solid content) per side in the same manner as Example 1 (namely forming an interconnecting layer of active material layer on the barrier layer). A 0.1 mol/L aqueous sodium hydroxide (NaOH) solution was dropped onto the surface of the test piece (namely, the surface of the barrier layer) followed by allowing to stand for 300 seconds (namely, 5 minutes) and determining the amount of time until the barrier layer peeled (duration of water resistance). As a result, the barrier layer was confirmed to withstand the water resistance test for 300 seconds.

In addition, a test piece for measuring membrane resistance of the barrier film alone was produced by forming a barrier layer on both sides of a power collector at about 2 g/m² (based on the solid content) per side in the same manner as Example 1 (namely, without forming an interconnecting layer or active material layer on the barrier layer). This test piece was placed between two copper plates and subjected to a pressure of 2500 N followed by measurement of sheet resistance (Ω·cm²) using the four-point probe method in compliance with JIS K7194. As a result, the membrane resistance of the barrier layer was 7.5 mΩ/cm².

[Production and Evaluation of Lithium Ion Battery]

Figure 7:
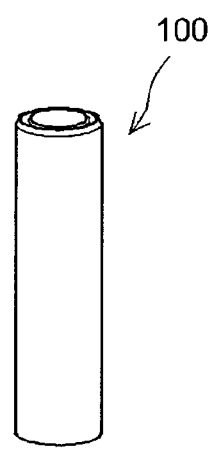
FIG. 7 is a perspective view schematically showing the form of a type 18650 lithium ion battery.

A total of 8 types of electrode sheets having different thickness compression ratios were produced in the same manner as Example 4 with the exception of making the thickness compression ratio during pressing following formation of the active material layer in the manufacturing of the electrode sheet as claimed in Example 4 0.67 (Example 4a), 0.71 (Example 4b), 0.75 (Example 4c), 0.78 (Example 4d: same as compression ratio of Example 4), 0.82 (Example 4e), 0.86 (Example 4H), 0.90 (Example 4g) or 0.96 (Example 4h), respectively. These electrode sheets of Examples 4a to 4h were then used as a positive electrode to produce an ordinary cylindrical lithium ion battery 100 (see FIG. 7) having a diameter of 18 mm and height of 65 mm (namely, type 18650) according to the procedure indicated below.

The following was used for the negative electrode. Namely, natural graphite (powder), SBR and CMC were mixed with ion exchange water so that the weight ratio of these materials was 98:1:1 and the solid content was 45% by weight to prepare an aqueous active material composition (negative electrode active material composition). This composition was then coated onto both sides of a long piece of copper foil (negative electrode power collector) having a thickness of about 15 μm followed by drying to form a negative electrode active material layer. With the negative electrode active material composition still dry, the total thickness including the power collector and the negative electrode active material layers formed on both sides thereof was about 120 μm. This was then pressed to a total thickness of 85 μm. A sheet-like negative electrode (negative electrode sheet) was produced in this manner.

The above-mentioned negative electrode sheet and an electrode sheet (positive electrode sheet) as claimed in each example were laminated with two long separators (porous polyethylene sheets were used here), and the laminated sheets were wound in the lengthwise direction to prepare a wound electrode body. The electrode body was housed in a cylindrical container together with a non-aqueous electrolyte, and the opening of the container was sealed to construct a lithium ion battery. A non-aqueous electrolyte (liquid electrolyte) having a composition in which a supporting salt (here, $LiPF_6$) was dissolved at a concentration of 1 mol/L in a mixed solvent of EC and DEC mixed at a ratio of 3:7 (volume ratio) was used for the non-aqueous electrolyte. Subsequently, suitable conditioning treatment was carried out (such as initial charge-discharge treatment consisting of repeating 2 to 3 times a procedure consisting of carrying out constant current charging for 3 hours at a charging rate of 1/10 C and then charging to 4.1 V at a constant current voltage at a charging rate of 1/3 C, and a procedure consisting of constant-current discharging to 3.0 V at a discharge rate of 1/3 C). A total of 8 types of type 18650 lithium ion batteries corresponding to each of the positive electrode sheets as claimed in Examples 4a to 4h were obtained in this manner.

Figure 8:
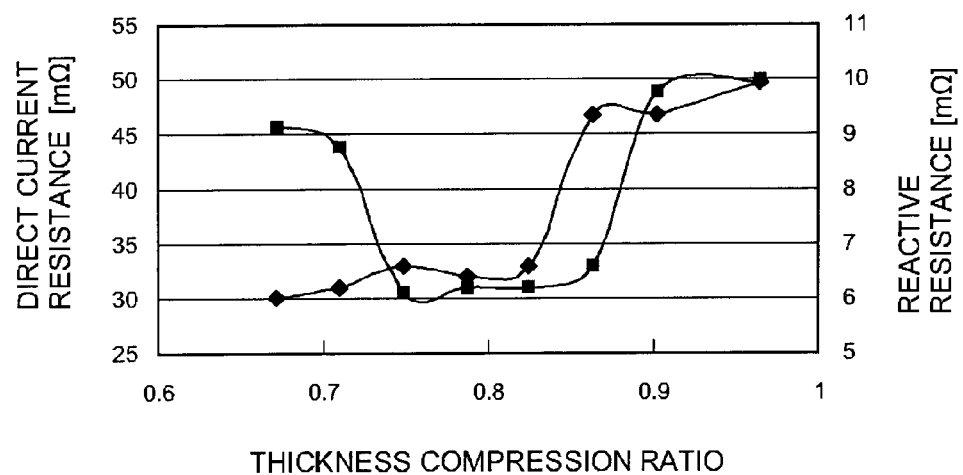
FIG. 8 is a graph illustrating the relationship between thickness compression ratio, direct current resistance and reactive resistance.

The alternating current impedance of these lithium ion batteries was measured using a sweeping measurement frequency, and direct current resistance and reactive resistance were read from a Cole-Cole plot of the resulting impedance (Z). Those results are shown in FIG. 8. In the graph, the black diamonds represent a plot of direct current resistance (mΩ), while the black squares represent a plot of reactive resistance (mΩ).

As shown in the graph, the values of direct current resistance and reactive resistance of the lithium ion batteries constructed using the positive electrode sheets having thickness compression ratios within the range of 0.74 to 0.82 (Examples 4c, 4d and 4e) were all low, and demonstrated particularly satisfactory performance for use as lithium ion batteries used for vehicle motive power sources and other applications. This result supports the finding that particularly satisfactory results can be realized by making the thickness compressive ratio within the range of 0.74 to 0.82 when using a positive electrode sheet of a composition in which granular conductive materials (here, acetylene black) are used in each of the barrier layer, interconnecting layer and active material layer.

The conductive material used to form the interconnecting layer in the above-mentioned Examples 1 to 3 (which was the same as the conductive material used to form the barrier layer and the active material layer in Examples 1 to 6) was acetylene black having a volatile content of 1% (and average particle diameter of 48 nm). A positive electrode sheet as claimed in Example 3b was produced in the same manner as Example 3 (namely, using acetylene black having a volatile content of 1% to form the barrier layer and the active material layer) with the exception of using acetylene black (average particle diameter: 48 nm) having a volatile content of 0.7% instead of the acetylene black described above to prepare the composition for forming an interconnecting layer. In addition, a positive electrode sheet as claimed in Example 3c was prepared in the same manner as Example 3 with the exception of using acetylene black (average particle diameter: 48 nm) having a volatile content of 1.4% instead of the above-mentioned acetylene black to prepare the composition for forming an interconnecting layer. These three types of positive electrode sheets having different volatile contents of the conductive material that composes the interconnecting layer were laminated with a negative electrode sheet, which has the same composition as that used to produce the type 18650 lithium ion battery described above, and separator sheets and then wound to produce a wound electrode body. This electrode body was housed in a laminated film container together with the above-mentioned non-aqueous electrolyte to construct a lithium ion battery having a capacity of about 500 mA, and after carrying out conditioning under the same conditions as the above-mentioned type 18650 lithium ion battery, the amount of gas generated was measured according to the water replacement method. As a result, the amount of gas generated by the battery using the positive electrode sheet as claimed in Example 3 (volatile content: 1%) was 2.1 mL, that of the battery as claimed in Example 3b (volatile content: 0.7%) was 1.7 mL, and that of the battery as claimed in Example 3c (volatile content: 1.4%) was 3.3 mL. According to the above results, the effect of further reducing the amount of generated gas by using a carbon material having a lower volatile content (and preferably, volatile content of 1% or less) for the conducting material used to compose the interconnecting layer was confirmed.

Example 7

In this example, carbon fibers synthesized by the vapor phase method (highly crystalline carbon nanofibers available under the trade name "VGCF" from Showa Denko K.K.) were used instead of the acetylene black (granular) used in Examples 1 to 5 for the conductive material used to form the interconnecting layer. Namely, vapor grown carbon fibers and PVDF were mixed with NMP so that the weight ratio ($R_C$) was about 90/10 to produce a composition for forming an interconnecting layer. An electrode sheet as claimed in Example 7 was produced in the same manner as Example 1 (and thus, using acetylene black having an average particle diameter of 48 nm in the same manner as Examples 1 to 3 to form the barrier layer and the active material layer) with the exception of using this composition for forming an interconnecting layer.

Example 8

In this example, the above-mentioned vapor growth carbon fibers and PVDF were mixed with NMP so that the weight ratio ($R_C$) was about 95/5 during preparation of the composition for forming an interconnecting layer. An electrode sheet as claimed in Example 8 was produced in the same manner as Example 7 with respect to other aspects.

Example 9

In this example, the above-mentioned vapor grown carbon fibers and PVDF were mixed with NMP so that the weight ratio ($R_C$) was about 97/3 during preparation of the composition for forming an interconnecting layer. An electrode sheet as claimed in Example 9 was produced in the same manner as Example 7 with respect to other aspects.

[Evaluation of Electrode Performance]

Sheet resistance ($\Omega \cdot cm^2$) was measured for the electrode sheets of each of the above-mentioned examples 7 to 9 in the same manner as the electrode sheets as claimed in Examples 1 to 6. Those results are shown in Table 2 together with the results of measuring sheet resistance of the electrode sheet as claimed in Example 6 not having an interconnecting layer. The compositions of the interconnecting layers provided in each of the electrode sheets are also shown in Table 2.

TABLE 2

| | Interconnecting layer composition (weight ratio) | | Sheet resistance |
|---|---|---|---|
| | VGCF | PVDF | ($m\Omega \cdot cm^2$) |
| Example 7 | 90 | 10 | 46 |
| Example 8 | 95 | 5 | 43 |
| Example 9 | 97 | 3 | 41 |
| Example 6 | (no interconnecting layer) | | 73 |

As shown in Table 2, in comparison with the electrode sheet of Example 6 in which the active material layer is formed directly on the barrier layer (and not having an interconnecting layer), the electrode sheets as claimed in Examples 6 to 9, in which the interconnecting layer was arranged between the barrier layer and the active material layer, were able to reduce sheet resistance by 35% or more. These electrode sheets of Examples 7 to 9 all had barrier layers of the same composition. Thus, electrode conductivity was confirmed to be able to improved without sacrificing performance of the barrier layer (and typically, performance that inhibits contact between the aqueous active material composition and the power collector) by providing the interconnecting layer.

[Production and Evaluation of Lithium Ion Battery]

A total of 10 types of electrode sheets having different thickness compression ratios were produced in the same manner as Example 8 with the exception of making the thickness compression ratio during pressing following formation of the active material layer in the manufacturing of the electrode sheet as claimed in Example 80.59 (Example 8a), 0.63 (Example 8b), 0.67 (Example 8c), 0.71 (Example 8d), 0.75 (Example 8e), 0.78 (Example 8f: same as compression ratio of Example 8), 0.83 (Example 8g), 0.86 (Example 8h), 0.90 (Example 8I) or 0.94 (Example 8j), respectively. Ten types of type 18650 lithium ion batteries corresponding to each of the electrode sheets were produced in the same manner as previously described with the exception of using the electrode sheets as claimed in Examples 8a to 8j for the positive electrode instead of the electrode sheets as claimed in Examples 4a to 4h.

Figure 9:
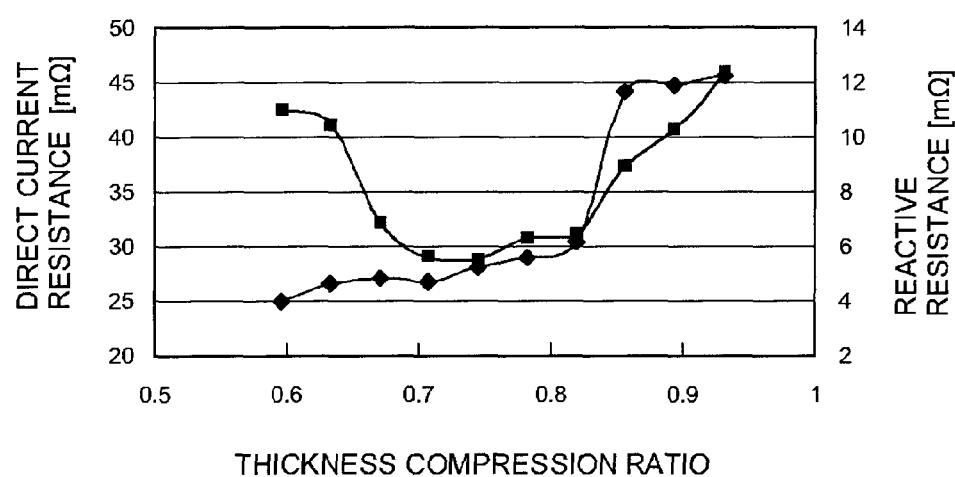
FIG. 9 is a graph illustrating the relationship between thickness compression ratio, direct current resistance and reactive resistance.

Direct current resistance and reactive resistance of these lithium ion batteries were then determined by measuring alternating current impedance in the same manner as previously described. Those results are shown in FIG. 9. In the graph, the black diamonds represent a plot of direct current resistance (mΩ), while the black squares represent a plot of reactive resistance (mΩ).

As shown in the graph, the values of direct current resistance and reactive resistance of the lithium ion batteries constructed using the positive electrode sheets having thickness compression ratios within the range of 0.67 to 0.83 (Examples 8c, 8d, 8e, 8f and 8g) were all low, and demonstrated particularly satisfactory performance for use as lithium ion batteries used for vehicle motive power sources and other applications. This result supports the finding that particularly satisfactory results can be realized by making the thickness compressive ratio within the range of 0.67 to 0.83 when using a positive electrode sheet of a composition in which granular conductive materials (here, acetylene black) are used in the barrier layer and the active material layer, and fibrous conductive materials (here, vapor grown carbon fibers) are used in the interconnecting layer.

Although the above has provided a detailed explanation of the present invention, the above-mentioned embodiments are merely intended to be exemplary, and various modifications or variations of the above-mentioned specific examples are also included in the present invention disclosed herein.

INDUSTRIAL APPLICABILITY

Figure 6:
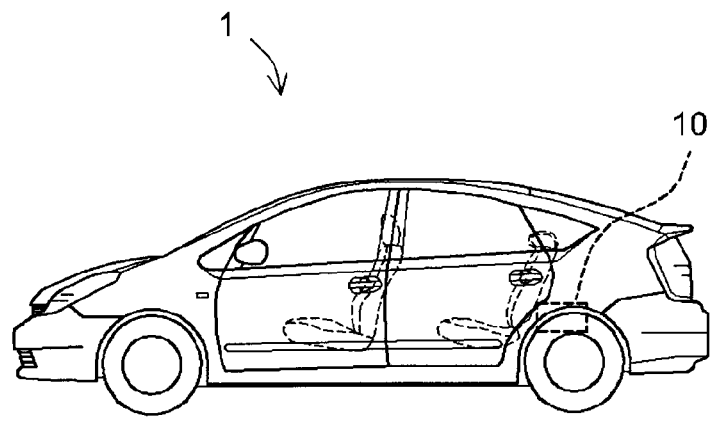
FIG. 6 is a schematic side view showing a vehicle (automobile) equipped with a lithium ion battery as claimed in an embodiment.

As a result of having the superior performance (such as output performance) described above, the lithium ion battery as claimed in the present invention can be preferably used as a power source for a motor installed in a vehicle such as an automobile. This lithium ion battery may also be used in the form of a battery pack by connecting a plurality thereof in series and/or in parallel. Thus, as schematically shown in FIG. 6, the present invention provides a vehicle (and typically, an automobile provided with a motor particularly in the manner of a hybrid automobile, electric automobile or fuel cell automobile) 1 provided with the lithium ion battery (which may also be in the form of a battery pack) 10 as a power source thereof.

The invention claimed is:

1. An electrode, comprising:
a metallic power collector;
an active material layer including an electrode active material as a main component being held by the metallic power collector;
a barrier layer provided on a surface of the power collector and containing a non-water-soluble polymeric material and a conductive material; and
an interconnecting layer that is interposed between the barrier layer and the active material layer, has higher electrical conductivity than the barrier layer, and contains a polymeric material and a conductive material,
wherein the barrier layer and the interconnecting layer each contain a granular conductive material, and the relationship between an average particle diameter $D_B$ of the granular conductive material contained in the barrier layer and an average particle diameter $D_C$ of the granular conductive material contained in the interconnecting layer satisfies the relationship of $D_B > D_C$.

2. The electrode according to claim 1, wherein the active material layer contains a granular conductive material, and the relationship between an average particle diameter $D_A$ of the granular conductive material contained in the active material layer and an average particle diameter $D_C$ of the granular conductive material contained in the interconnecting layer satisfies the relationship $D_A > D_C$.

3. The electrode according to claim 1, wherein the interconnecting layer contains carbon fibers, and at least a portion of the carbon fibers are arranged between the interconnecting layer and the active material layer and/or between the interconnecting layer and the barrier layer.

4. A battery, comprising the electrode according to claim 1.

5. A lithium ion battery, comprising the electrode according to claim 1 as a positive electrode.

6. A vehicle provided with the lithium ion battery according to claim 5.

7. The electrode according to claim 1, wherein the relationship between a weight ratio $R_B$ of the conductive material/polymeric material in the barrier layer and a weight ratio $R_C$ of the conductive material/polymeric material in the interconnecting layer satisfies the relationship of $R_B < R_C$.

8. The electrode according to claim 7, wherein the active material layer contains a granular conductive material, and the relationship between an average particle diameter $D_A$ of the granular conductive material contained in the active material layer and an average particle diameter $D_C$ of the granular conductive material contained in the interconnecting layer satisfies the relationship $D_A > D_C$.

9. An electrode, comprising:
a metallic power collector;
an active material layer including an electrode active material as a main component being held by the metallic power collector;
a barrier layer provided on a surface of the power collector and containing a non-water-soluble polymeric material and a conductive material; and
an interconnecting layer that is interposed between the barrier layer and the active material layer, has higher electrical conductivity than the barrier layer, and contains a polymeric material and a conductive material,
wherein the active material layer and the interconnecting layer each contain a granular conductive material, and the relationship between an average particle diameter $D_A$ of the granular conductive material contained in the active material layer and an average particle diameter $D_C$ of the granular conductive material contained in the interconnecting layer satisfies the relationship $D_A > D_C$.

10. The electrode according to claim 9, the relationship between a weight ratio $R_B$ of the conductive material/polymeric material in the barrier layer and a weight ratio $R_C$ of the conductive material/polymeric material in the interconnecting layer satisfies the relationship of $R_B < R_C$.

11. The electrode according to claim 9, wherein the interconnecting layer contains carbon fibers, and at least a portion of the carbon fibers are arranged between the interconnecting layer and the active material layer and/or between the interconnecting layer and the barrier layer.

12. A battery, comprising the electrode according to claim 9.

13. A lithium ion battery, comprising the electrode according to claim 9 as a positive electrode.

14. A vehicle provided with the lithium ion battery according to claim 13.

15. A method for manufacturing an electrode, in which an active material layer having an electrode active material as a main component is held by a metallic power collector, the method comprising:
forming a barrier layer on a surface of the power collector by applying a composition for forming a barrier layer, which contains a conductive material, a non-water-soluble polymeric material and a solvent that dissolves the polymeric material, to the power collector;

forming an interconnecting layer onto the barrier layer by applying a composition for forming an interconnecting layer, the composition containing a conductive material, a polymeric material and a solvent that dissolves the polymeric material; and forming an active material layer onto the interconnecting layer by applying an aqueous active material composition, wherein the barrier layer and the interconnecting layer each contain a granular conductive material, and the relationship between an average particle diameter $D_B$ of the granular conductive material contained in the barrier layer and an average particle diameter $D_C$ of the granular conductive material contained in the interconnecting layer satisfies the relationship of $D_B > D_C$.

16. The method according to claim 15, wherein the solvent that composes the composition for forming a barrier layer is an organic solvent.

17. A method for manufacturing an electrode, in which an active material layer having an electrode active material as a main component is held by a metallic power collector, the method comprising:
forming a barrier layer on a surface of the power collector by applying a composition for forming a barrier layer, which contains a conductive material, a non-water-soluble polymeric material and a solvent that dissolves the polymeric material, to the power collector;

forming an interconnecting layer onto the barrier layer by applying a composition for forming an interconnecting layer, the composition containing a conductive material, a polymeric material and a solvent that dissolves the polymeric material; and forming an active material layer onto the interconnecting layer by applying an aqueous active material composition, wherein the active material layer and the interconnecting layer each contain a granular conductive material, and the relationship between an average particle diameter $D_A$ of the granular conductive material contained in the active material layer and an average particle diameter $D_C$ of the granular conductive material contained in the interconnecting layer satisfies the relationship $D_A > D_C$.

18. The method according to claim 17, wherein the solvent that composes the composition for forming a barrier layer is an organic solvent.

* * * * *